United States Patent
Repperger et al.

(10) Patent No.: US 7,689,054 B1
(45) Date of Patent: *Mar. 30, 2010

(54) COMPUTATIONALLY ENHANCED IMAGE RECOGNITION DEVICE

(75) Inventors: Daniel W. Repperger, Dayton, OH (US); Alan R. Pinkus, Bellbrook, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1034 days.

This patent is subject to a terminal disclaimer.

(21) Appl. No.: 11/398,742

(22) Filed: Mar. 31, 2006

(51) Int. Cl.
*G06K 9/00* (2006.01)

(52) U.S. Cl. ............... 382/254; 382/162; 382/167; 382/168

(58) Field of Classification Search .......... 382/162, 382/167, 168, 256
See application file for complete search history.

(56) References Cited

U.S. PATENT DOCUMENTS

| 4,398,685 A | 8/1983 | Task et al. |
| 5,070,239 A | 12/1991 | Pinkus |
| 5,679,949 A | 10/1997 | Task et al. |
| 5,729,010 A | 3/1998 | Pinkus et al. |
| 6,775,408 B1 * | 8/2004 | Masaki ............... 382/167 |
| 7,177,452 B2 * | 2/2007 | Wong et al. ........... 382/128 |
| 7,298,896 B2 * | 11/2007 | Yamaguchi et al. ..... 382/172 |
| 2006/0110033 A1 * | 5/2006 | Toshihiro ............. 382/162 |

OTHER PUBLICATIONS

David R. Martin, "Learning to Detect Natural Image Boundaries Using Local Brightness, Color,and Texture Cues", IEEE Transactions on Pattern Analysis and Machine Intelligence, vol. 26, No. 5, May 2004, pp. 530-549.*

* cited by examiner

*Primary Examiner*—Brian Q Le
*Assistant Examiner*—Mekonen Bekele
(74) *Attorney, Agent, or Firm*—AFMCLO/JAZ; Daniel J. Krieger

(57) ABSTRACT

A device is described in which a visual image can be enhanced to better recognize different objects that appear in a picture. Means are provided for an operator to manipulate a visual image by adjusting darkness levels within each primary color to embellish the recognition of distinct objects which may appear in the visual rendering. The device may be implemented as a ground-based system where the operator can adjust the algorithm to manipulate the darkness levels of a certain number, N, of pixels. A second implementation can be achieved in a helmet mounted display or glasses donned by an operator.

14 Claims, 9 Drawing Sheets

$J_1$ versus noise intensity and Monte carlo Parameter

COMPUTATIONALLY ENHANCED IMAGE RECOGNITION DEVICE

RIGHTS OF THE GOVERNMENT

The invention described herein may be manufactured and used by or for the Government of the United States for all governmental purposes without the payment of any royalty.

BACKGROUND OF THE INVENTION

Often in real war-time scenarios, an operator of an air or ground based vehicle uses imaging equipment in order to assess threat and make strategic decisions. A significant problem in this field is often the quality of such visual images and more specifically the problem of helping to distinguish objects that may appear in a visual image when the vehicle operator has to make a decision about the content of the picture in a short amount of time.

The present invention solves the problem of distinguishing objects that may appear in a visual image of poor quality and where an operator has to make a decision about the content of such image in a short amount of time. To better understand the decision-making process of interest, a simple military example will be first discussed. In the military application, the effects of being too aggressive or too conservative in decision-making have both costs and risks. For an example of a military application related to this scenario, assume a decision maker approaches a tree in a foreign country with a person hiding in the tree. The person in the tree may be either friendly or hostile. An immediate action of the decision-maker is required. If the decision-making process is too aggressive, the soldier on the ground will shoot at the object in the tree. If the soldier in the tree is friendly (not hostile), this "friendly fire" incident has a great penalty to the decision-maker. On the other hand, if the object in the tree is a hostile (enemy) soldier, the conservative decision to not fire at the object may result in the enemy soldier attacking the decision-maker. Thus the error in ignoring the information is even more costly to the person making the action who is required to elicit a binary choice response.

FIGS. 4a and 4b describe, in a statistical manner, the two types of errors that could occur for our military example of the identification of the man-in-the-tree just presented. In FIGS. 4a and 4b the x-axis at 401 represents decision making and the y-axis at 400 represents the probability of the intention of the man in the tree. In FIGS. 4a and 4b, the hypothesis $H_0$ is the true situation that the man in the tree is friendly, illustrated at 402 and 404. $H_1$ is the true situation that the man in the tree is hostile. Let us define type 1 error (friendly fire) as the event of shooting the object in the tree when it is really friendly. In FIG. 4a, this corresponds to the area $A_1$ at 407. In FIG. 4a, we define the type 2 error (mistake of not firing at the tree) as the situation that the man in the tree is hostile but since we do not fire, the hostile agent attacks us and this is represented as area $A_2$ at 406. The ideal situation in decision making is to minimize both the type 1 and type 2 errors at the same time.

FIG. 4a shows the types of error that exist for a binary decision-making process. Usually the decision maker operates on some measurement on the x-axis. This may be translated into the terms "don't shoot until you see the whites of their eyes". In other words, some measurement is made on the x-axis of a variable in the environment and then an action has to be decided as belonging to the class $H_0$ or $H_1$ based on the measurement. The decision maker may be more or less aggressive depending on the measurement on the x-axis before selecting either $H_0$ or $H_1$. Thus there is a trade off between the type 1 and type 2 error thus described. The total error does not actually decrease, it just trades off (e.g. if you want less type 1 error, we absorb more type 2 error and conversely). A significant aspect of the present invention is introducing a different means to this basic problem of decision making.

It has been documented in prior works that for certain images, by adding small amounts of noise, it is possible to enhance the recognition of specific objects in the picture. What is significant is how the noise is added. FIG. 7 shows a drawing illustrating how stochastic noise can enhance a visual image. In FIG. 7, this classic example simply adds white Gaussian noise in going from left 700 to 701 and right 702. There appears to be an optimum amount of noise 701 that enables better object identification. Too little 700 or too much 702 noise is counter productive in the identification of the object in the picture. This leads into a significant novel aspect of the present invention and solves the problem in the prior art. In the prior art, random errors are added to a visual image in a manner that object identification is improved. The present invention discloses a systematic means to add randomness except to increase the noise intensity.

SUMMARY OF THE INVENTION

A device which enhances an operator's ability to recognize different objects that appear in a picture. A visual image is manipulated by providing means for adjusting darkness levels within each primary color to embellish the recognition of distinct objects which may appear in the visual image. The overall device may be implemented as either a ground-based system where the operator can adjust the algorithm to manipulate the darkness levels of a certain number, N, of pixels, or as a head mounted device donned by an operator.

It is an object of the invention to provide an image enhancement device that enhances an operator's ability to recognize different objects that appear in a picture.

It is another object of the invention to provide an image enhancement device that enhances an operator's ability to recognize different objects that appear in a picture by providing means for adjusting darkness levels within each primary color to embellish the recognition of distinct objects which may appear in the visual image.

It is another object of the invention to provide a ground-based image enhancement device that enhances an operator's ability to recognize different objects that appear in a picture.

It is another object of the invention to provide a head-mounted image enhancement device that enhances an operator's ability to recognize different objects that appear in a picture.

These and other objects of the invention are achieved through the description, claims and accompanying drawings and by an image enhancement method comprising the steps of:

receiving visual data of a desired object within a compressed image using multi-spectral sensors;

transmitting said visual data to a central processing unit;

decomposing said visual data into histograms of frequency of pixels versus darkness level within each primary color red, blue and green and selecting the most highly uncertain color;

constructing a parabolic template with the vertex of the parabola appearing at the mean distribution of the total area under the histogram curve;

overlaying a true histogram from said visual data and said parabolic template;

generating a spatial gradient of all candidate pixels;

moving N number of pixels with maximum gradients through operator adjustment knob manipulation;

transferring an output signal of an enhanced visual image of said desired object from said central processing unit to said operator.

DETAILED DESCRIPTION

The present invention solves the problem of distinguishing objects that may appear in a visual image of poor quality and where an operator has to make a decision about the content of such image in a short amount of time. There are two preferred arrangements suggested in the present invention to implement the device.

Ground-Based Image Enhancement System

Figure 1:
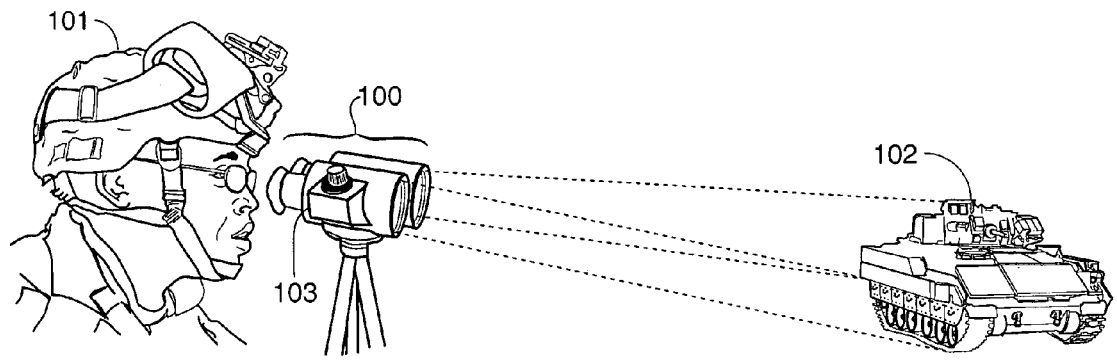
FIG. 1 shows a drawing of a head-mounted image enhancement device.

In the ground-based image enhancement device of the present invention, the operator is in a stationary position situated across from a ground-based system and a visual image of poor quality is portrayed to him as in FIG. 1. FIG. 1 shows a drawing of a binocular-type digital imaging device. In this preferred arrangement of the invention, the operator 101 adjusts a knob 103, on binoculars 100 which controls (through a central processing unit as indicated) how the darkness level of certain pixels in the picture (within each primary color) may be manipulated. The operator continues to adjust the modified picture by turning the knob until he feels maximum information has been received from the external environment in terms of recognizing distinct objects 103 in the picture. This has analogies to focusing a normal light lens until the image appears sharper or has higher contrast and the identification in terms of the objects within the image becomes improved.

Figure 2:
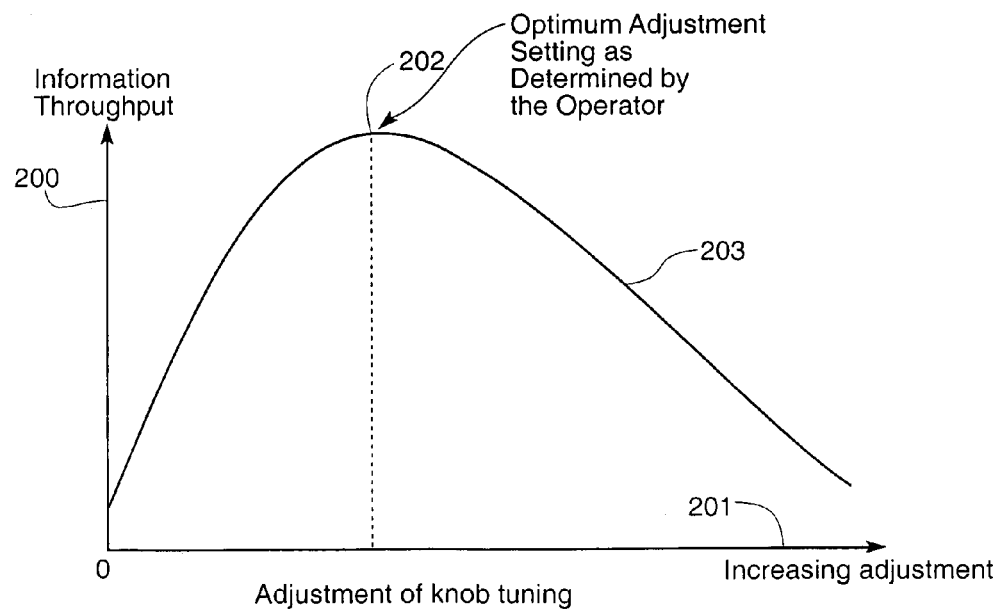
FIG. 2 shows a graph illustrating the shape of the information throughput curve as a result of operator adjustment according to the device of the invention.

As it will be shown, the shape of the information throughput curve generated by the operator adjustment is displayed in FIG. 2. The x-axis at 201 in FIG. 2 corresponds to turning the adjustment knob 103 in FIG. 1 and the y-axis 200 in FIG. 2 corresponds to the information throughput 203 which is shown at an optimal setting at 202. The operator 101 manipulates the adjustment knob 103 until he feels comfortable that the visual rendering of the scene 102 is improved over its original state.

Use of a Helmet Mounted Display or Eye-Glass System

Figure 3:
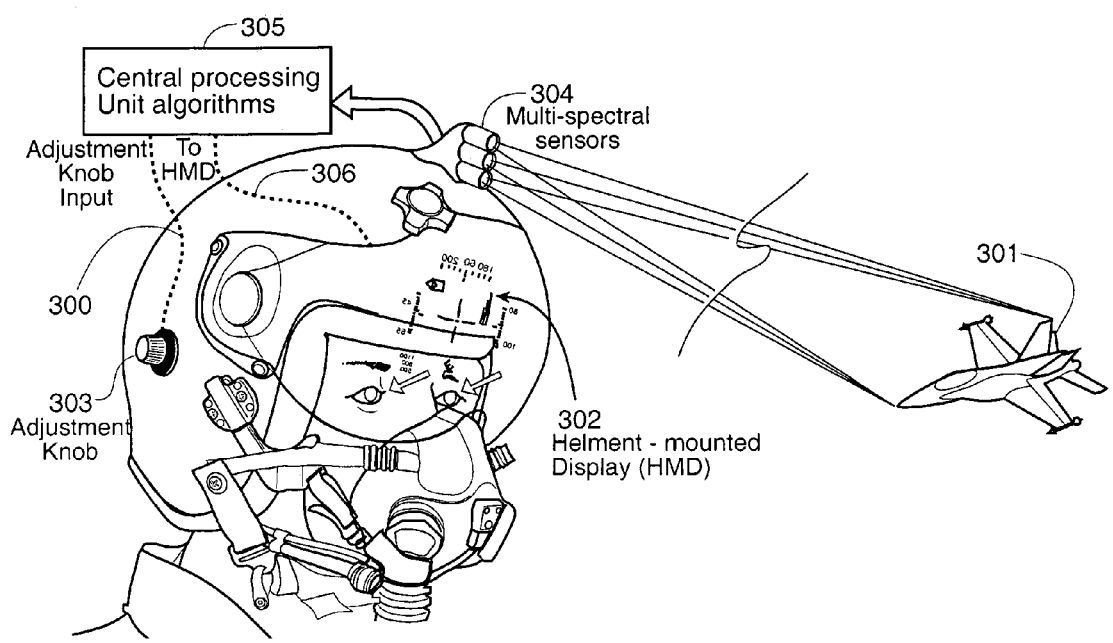
FIG. 3 shows a detailed drawing of head mounted image enhancement device according to the device of the invention.

Another preferred arrangement of the invention is an operator wearing a helmet-mounted display or eye-glass system and having mobility. FIG. 3 shows a drawing of head mounted display device. This display may be a night vision goggle device to amplify light or other apparatus to enable the user to discern better quality information from the environment yet still be able to move around. In FIG. 3, the aircraft object 301 to be examined impacts the visual display at the multi-spectral sensors 304. This data is then transferred to the central processing unit 305, which may consist of a chip or other microprocessor element. At the central processor 305 is a signal 300 received from the output of the adjustment knob 303. After the image is enhanced, the final output signal to the HMD (head mounted display) 302 is transferred from the CPU to the HMD at 306. The signal is further transferred to the optical glass 302 as indicated. The operator sees the enhanced image at the optical glass. There may exist a latency in producing the enhanced image at point 302 because of the computation time and cycle time to process the requisite information.

Reducing Error

Figure 4A:
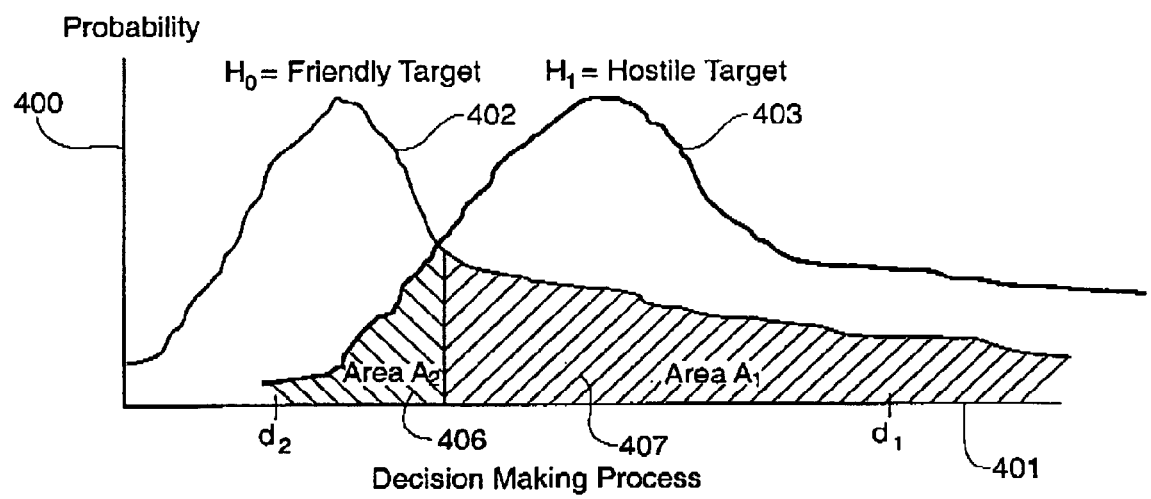
FIG. 4a shows a graph illustrating the first type of error that could occur for the man-in-the-tree military scenario.
Figure 4B:
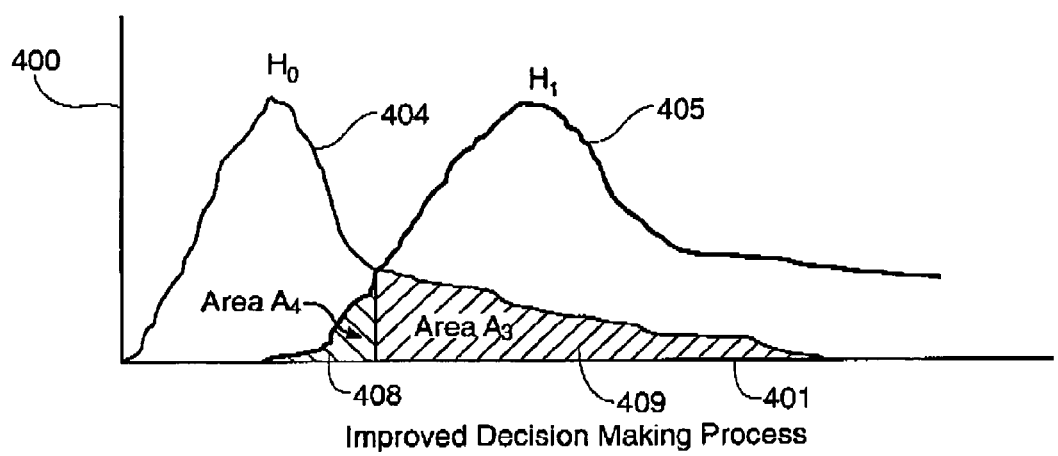
FIG. 4b shows a graph illustrating the second type of error that could occur for the man-in-the-tree military scenario.

In FIG. 4b, a novel means for decision making according to the present invention is described. The former Type 1 error ($A_1$) is now replaced by the area $A_3$ at 409 in FIG. 4b. Note that in FIG. 4b, this area is reduced, i.e. $A_3<A_1$. Also, the former Type 2 error ($A_2$) is now replaced by the area $A_4$ at 408 in FIG. 4b. Again, this type 2 error is reduced in FIG. 4b because $A_4<A_2$. Thus both the former type 1 and type 2 errors are reduced simultaneously. This differs from traditional means of decision making where the errors just trade off against each other. The device of the present invention provides a means to simultaneously reduce both type 1 and type 2 error.

Illustration of the Concept of Stochastic Resonance

The term "stochastic resonance" (SR) is used in certain contexts to mean that noise or some uncertainty (stochastic) may be added to a system in an appropriate manner and that certain "resonance" or optimization of some key attribute of a system may be realized. Applying this to the present invention, the attribute that will be optimized (improved) is the information delivered to the human operator in terms of recognizing distinct objects in a visual scene, which is of poor quality. Stochastic resonance is nonlinear and does not work in every case. It must be applied appropriately. The present invention provides a systematic means for applying this technique to visual images.

Figure 5A:
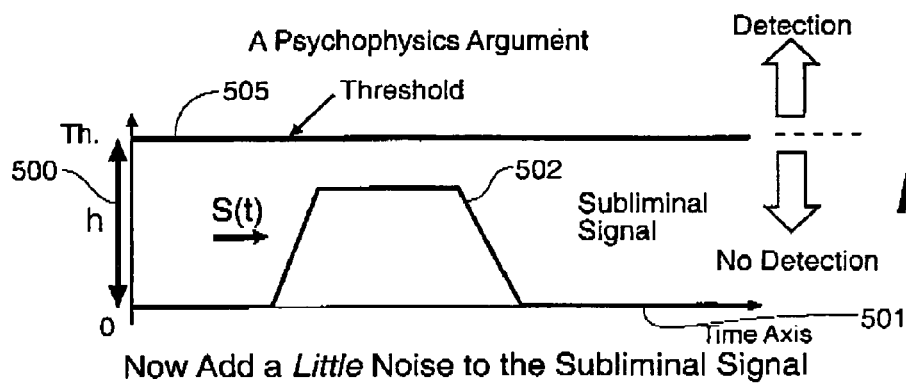
FIG. 5a shows a graph illustrating stochastic noise with no noise added according to the arrangement of the invention.
Figure 5B:
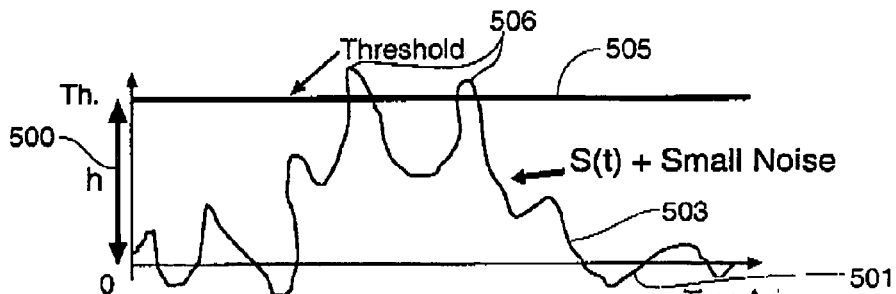
FIG. 5b shows a graph illustrating subliminal signal in its high state according to the arrangement of the invention.
Figure 5C:
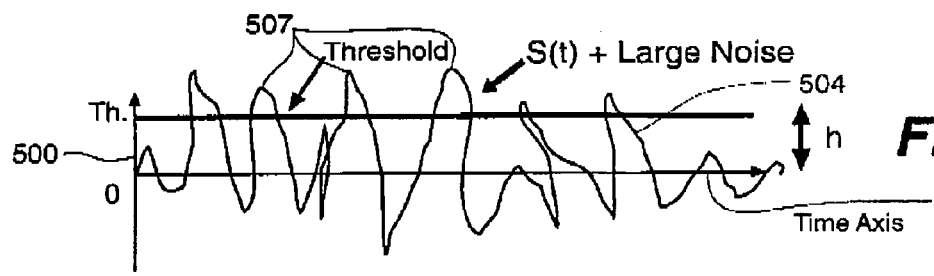
FIG. 5c shows a graph illustrating stochastic noise with a high level of noise added according to the arrangement of the invention.

One interpretation of SR is in the identification of faint signals when they are below a threshold. FIGS. 5a, 5b and 5c are graphs of subliminal signals with levels of added noise. For each of FIGS. 5a, 5b and 5c, the x-axis represents time at 501 and the y-axis represents the threshold level h at 500. FIG. 5a shows a faint (subliminal signal) S(t) at 502 which is below the threshold 505 of h units. Similar to identifying the hostile soldier in the tree, the binary decision to be made involves the correct detection when S(t) is high. Since the maximum value of S(t) is always below the threshold h, (S(t)<h), there is initially a zero probability of correctly detecting S(t) as being high, when it is truly in this state. FIG. 5a corresponds to the case of no noise added to S(t) 502. FIG. 5b shows the situation when a low level of white-Gaussian noise is added to S(t) 503. In 5b, it can be seen that when S(t) is in its high state, it occasionally will pierce through the threshold h 505 and be detected, illustrated at 506. Thus the number of missed negatives is reduced (a missed negative is defined as S(t) really being high, but we miss the opportunity to correctly classify it as high). FIG. 5c shows the situation where a high level of noise is added to S(t), illustrated at 504. In FIG. 5c, when S(t) is high, it most likely will pierce through the threshold h and be classified as being in the high state. Thus the number of missed negatives continues to decrease as the intensity of the noise increases. However, in FIG. 5c, when S(t) is in the low state, it sometimes still pierces through the threshold h producing a false error, illustrated at 507. Thus, the disadvantage of the high noise state is that the number of false positives increases. One would assume that there is an "optimum" amount of noise to add to S(t) to enhance the correct detection of S(t) when it is really high, but not produce too many false positives.

Figure 6:
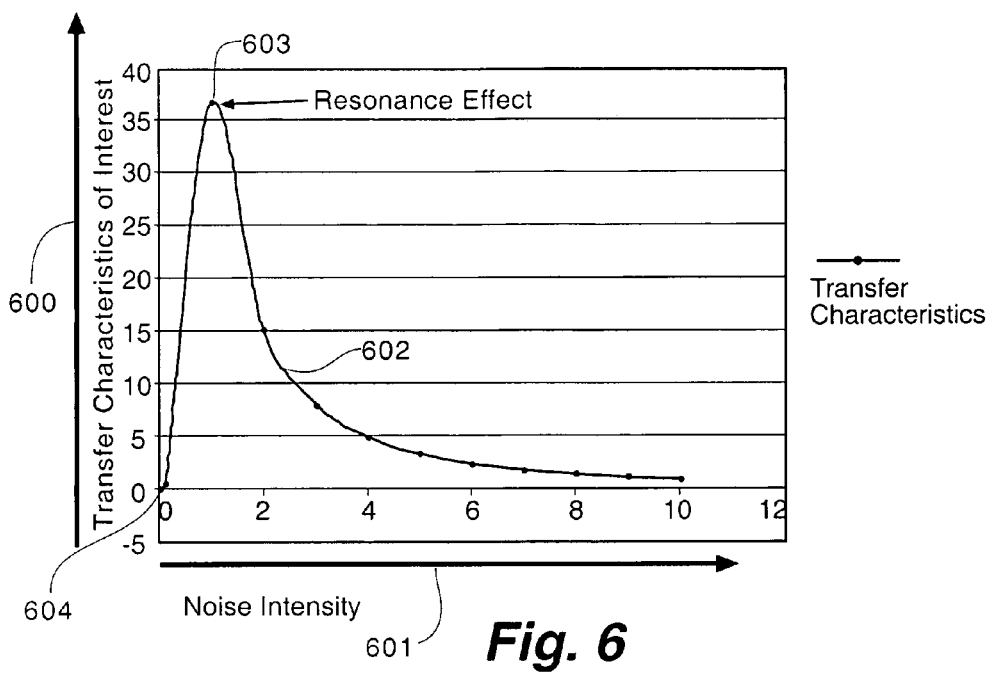
FIG. 6 shows a graph of a resonance curve of the signals of FIGS. 5a, 5b and 5c.
Figure 7:
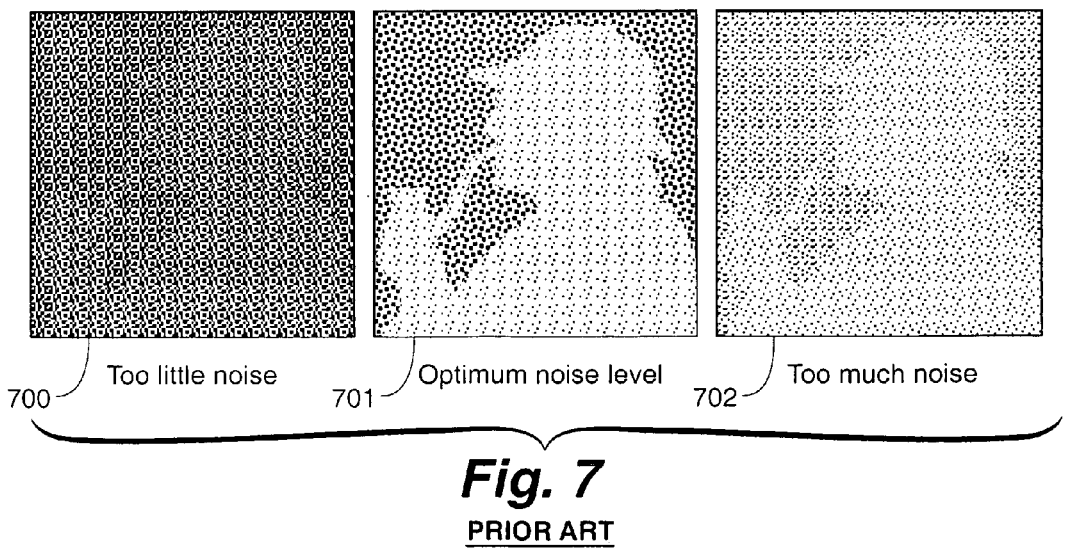
FIG. 7 shows a prior art illustration of how stochastic noise can enhance a visual image.

FIG. 6 shows a graph of a resonance curve of the signals of FIGS. 5a, 5b and 5c.

In FIG. 6, the origin 604 corresponds to the case of no noise added or FIG. 5a. The x-axis 601 in FIG. 6 corresponds to the intensity of the noise added to S(t). The y-axis 600 is proportional to the probability of the correct detection of S(t) when it is really high. The curve in FIG. 6 starts at the origin 604 because with no noise, added, the correct detection of S(t) when it is high is zero because it is initially always lower than h. In going to the right 601 in FIG. 6, the noise intensity increases. The SR curves starts to rise from the origin because the number of missed negatives starts rapidly decreasing. The curve rises until the optimum amount of noise is added and the curve is at its resonance point 603. To the right of the resonance point, the curve starts to drop 602. This occurs because the number of missed negatives still is decreasing (as the noise intensity increases), but the number of false positives is increasing at a far greater rate, thus hurting the overall decision making process. One can now see why the terms "stochastic" and "resonance" are used to describe this process. In applications of signal processing (one-dimensional signals), the y-axis 600 of FIG. 6 can also be a signal to noise ratio improvement for the identification of one-dimensional signals.

The present invention will consider two or more dimensional signals involved in an image processing device. Amplification of a signal to noise ratio is well known with signals of a one-dimensional nature. It is commonly known that an increase in signal to noise ratio is generally correlated with improved detectability of targets, especially when immersed in high levels of uncertainty.

It is emphasized that the state of the art at the present time is to just add noise to certain images. The present invention differs from the prior devices in several novel aspects. First, there is no means for adding noise to the image. The device selects "confused pixels" and reassigns them as either pure black (absence of color) or pure white (full color). Second, a parabolic template sets the standard for moving pixels either left or right. Third, the actual pixels adjusted must simultaneously satisfy two conditions: (i) they must have a frequency that appears above the template, and (ii) they must have maximum darkness spatial gradient with respect to the other pixel candidates and fourth, N (the number of pixels to be moved) can be varied by the operator for maximum information throughput.

Outline of the Image Enhancement Device

For simplicity, a compressed image (.jpg) is considered. Consider an image of very poor quality in terms of Object recognition. Also being a compressed image, there are inherent distortions already built into the picture making it a challenging task for discerning objects.

Means for decomposing an image into the three primary colors and initially manipulating the most highly uncertain color. For each of the three primary colors (red, green, and blue), the original image is first decomposed into histograms of frequency of pixels versus darkness level, within each color. The color blue has the most uncertainty. This is analogous to the distributions in FIG. 4a having the most amount of overlap. With a great deal of overlap, by reassigning the pixels as either black or white (analogous to choosing $H_0$ or $H_1$ in FIG. 4a), the overlap areas $A_1$ and $A_2$ correspondingly decrease. For the highly uncertain pictures, here is where this effort can be most productive since this is the case for the greatest amount of overlap.

Means for constructing a parabolic template. The vertex of the parabola appears at the mean distribution of the total area under the histogram curve. The area under the parabola is slightly larger than the total area under the original histogram curve of the original image. A pure black and white rendering of a picture would produce only histograms on the black axis (darkness=0) or white axis (darkness=1). A parabola tries to distinguish edges (pure black and white) in the picture but at the same time allows for the distinction of classes of objects (other shades of black or white). Two biological reasons exist on this type of distinction: (a) light intensity varies inversely proportional to the square of the distance from a source, (b) the distribution of darkness levels of pixels has a physiological basis to be proportional to a parabola. Hence, there should be an exponential and parabolic dependence on frequency of pixels and gray levels. The parabola is just a approximation to the ability of humans to discern objects in an illumination sense.

Means for moving of the excess pixels above the template: An overlay plot is made of the true histograms (from the raw image) and the template. It is observed that the true data are, at times, above the template. When the data (true histograms) is above the template, the device provides means for moving pixels to either 0 (pure black or absence of color) or to 1 (full color or maximum brightness). The assumption is that certain pixels cause the confusion factor (similar to the areas $A_1$ and $A_2$ in FIGS. 4a and 4b). By reassigning the pixels to the right or left (making a decision on the object—white or black), reduces the effective area in FIG. 4a as demonstrated by the fact that $A_3 < A_1$ and $A_4 < A_2$ in the comparison of FIG. 4a and FIG. 4b.

Means for moving pixels with the maximum darkness spatial gradient. From the previous step we know that certain darkness levels provide candidates to be adjusted. It is extremely important to select the appropriate pixels in the picture (in a spatial sense) that are to be adjusted. This is accomplished by generating a spatial gradient of all the candidate pixels. A spatial gradient is the rate of change of the darkness level with respect to spatial distance in the image in both the x and y direction. Of the candidate pixels from the previous step, their spatial gradients are rank ordered in terms of their magnitude. The pixels with the maximum gradients are moved either left (to zero or pure black) or to the right (to 1.0 or pure white (maximum color)). It is clear that if an edge existed in the picture, the darkness spatial gradient would be at a maximum (sudden change from black to white). If a distinct object is in the picture, this gradient would be at a maximum and provides a good candidate to adjust the darkness level to 0 or 1 (indicating an edge may be at this spatial location).

Means for selecting only N pixels to move: Only N pixels are moved left. Also only N pixels are moved right. N is adjusted by the operator. N has analogy to the intensity of the noise level of the SR curve in FIG. 6. The optimum N is selected so that object identification is achieved. Too little N or too much N may be counter productive to the improvement of object recognition by the operator. The adjustment knob in FIGS. 1 and 3 adjusts N, the number of pixels to move both left and right in the image enhancement process. As will be demonstrated below, the maximum information transfer occurs by moving the minimum number of N pixels that would enhance object identification. Much like the SR curve in FIG. 6, additional work (moving more than N pixels) may erode the possibility of identifying objects in the visual rendering. The human operator has the option of moving only N pixels until the information transferred has been optimized.

Means for displaying a movie file. A movie file is displayed to the operator of this potential rendering to help him determine the proper N values that optimize the recognition of objects in the image.

To study the effect of the algorithm presented herein on improved decision making, a Monte Carlo computer simulation is performed. A Monte Carlo simulation adds randomness to a system and the performance of the overall system may be evaluated by looking at expected (mean values) of certain output variables. These simulations are valuable because performance measures may be obtained when the mathematics or physics of a problem is too difficult to understand or determine in closed form.

Figure 8:
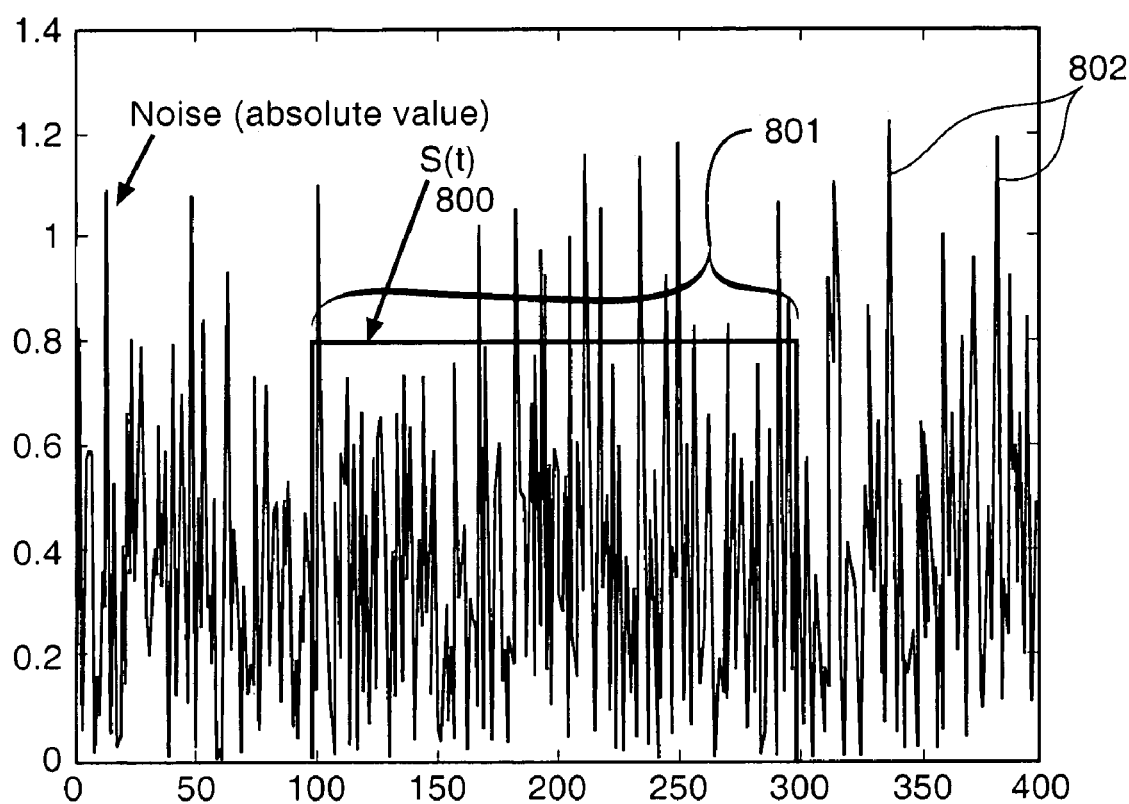
FIG. 8 shows a graph of a stochastic noise pulse high 50% of the time and low 50% of the time.

The Monte Carlo simulation assumes a wide range of noise values. In all cases the highest value of S(t) with no noise added is always less than h (|S(t)|<h). Random white noise is then added to S(t). For simplicity a 50% duty cycle will be assumed for S(t). This means that S(t) is a pulse which is high 50% of the time and low 50% of the time. The goal is to find the level of noise that helps promote the correct detection of S(t) being high, when this is the correct event. FIG. 8 is a graph illustrating these assumptions. FIG. 8 shows the signal S(t) at 800, which is high 50% of the time, illustrated at 801 and low 50% of the time. For simplicity, the threshold h was set to h=1.0. The noise to be added 802 is also displayed in FIG. 8.

Figure 9:
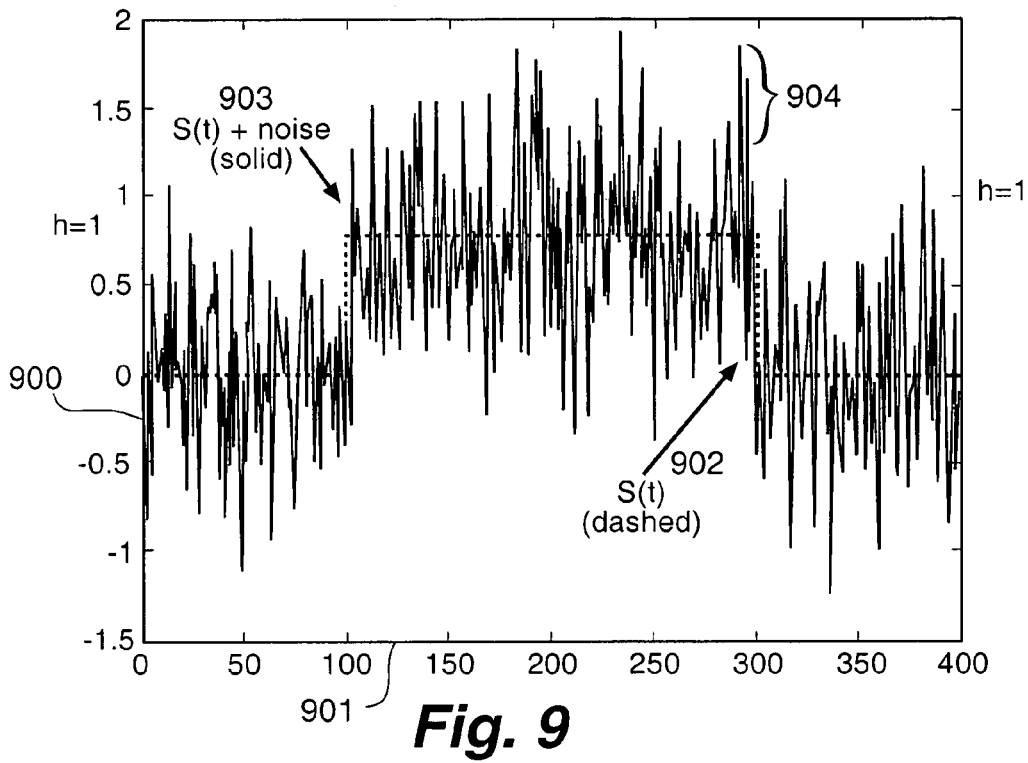
FIG. 9 shows a graph of the signal and noise of FIG. 8.
Figure 10:
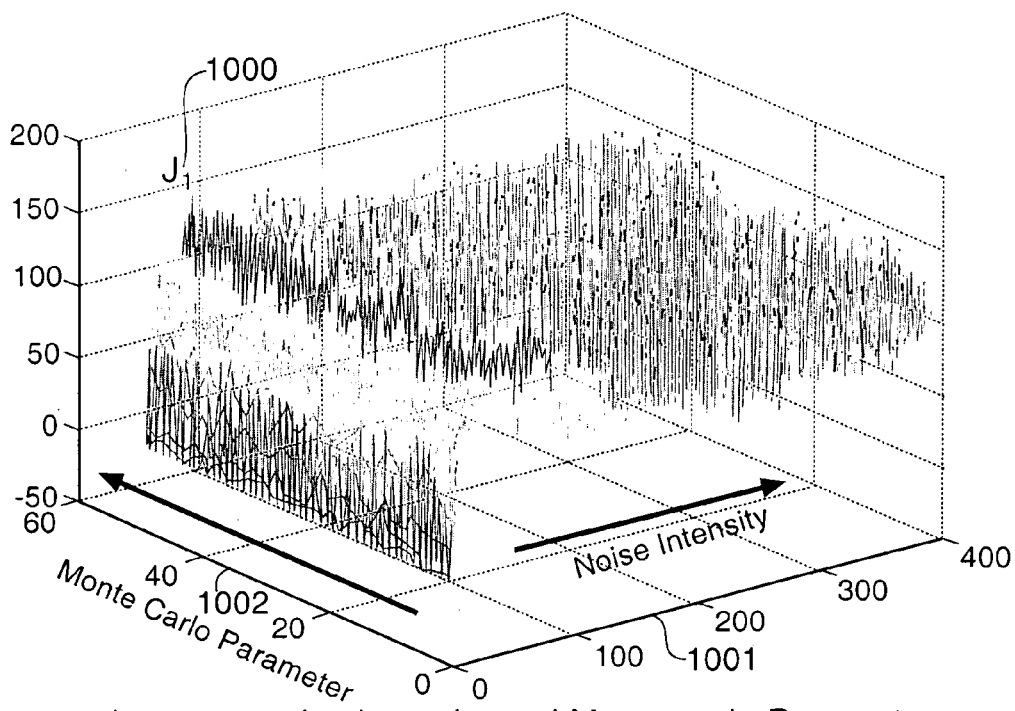
FIG. 10 shows a three-dimensional plot of the performance metric versus the noise parameter gain and the Monte Carlo simulation parameter.

FIG. 10 shows a three-dimensional plot of the performance metric on the y-axis 1000 versus the noise parameter gain on the x-axis 1001 and the Monte Carlo simulation parameter. FIG. 9 portrays the signal S(t) using a dashed line at 1002 and (S(t)+noise) at 1002 for h=1. It is clear that there are cases when S(t)+noise exceeds the threshold h, illustrated at 1004, when S(t) is really low (false positives occur). Also when S(t)+noise may be still be less than h when S(t) is in the high state (missed negatives occur). These simulations will have max |S(t)|/h=0.8.

The performance of the system can be related to correct decision making. From FIG. 8, it is apparent that with no noise added, assuming 400 time samples, that 200 missed negatives occur automatically and 0 false positives are determined. Zero hits are scored in this scenario. A hit is defined as when S(t)+noise is greater or equal to h, when S(t) is really high. The performance metric chosen is $J_1$ (based on a 400 sample time series) where:

$$J_1 = 200 - \text{number of missed negatives} - \text{number of false positives} + \text{hits} \quad \text{(Eq. 1)}$$

Thus $J_1=0$ if no noise is added to S(t). If $J_1$ increases above zero, this is an improvement on decision making. The goal is to plot the performance metric $J_1$ versus the intensity of the noise.

To quantify the level of uncertainty, gain1 is defined as a noise intensity parameter which multiplies the random noise generator producing the signal to be added to S(t). Thus the power in the noise is proportional to $(\text{gain1})^2$. The key to success in this study is to see how $J_1$ varies with respect to gain1 for different Monte Carlo runs. FIG. 10 shows a three dimensional plot of $J_1$ on the z-axis at 1000 versus the noise parameter gain1 on the x-axis at 1001 (from 1-400) and the Monte Carlo simulation parameter on the y-axis at 1002 (1-50 random runs).

Figure 11:
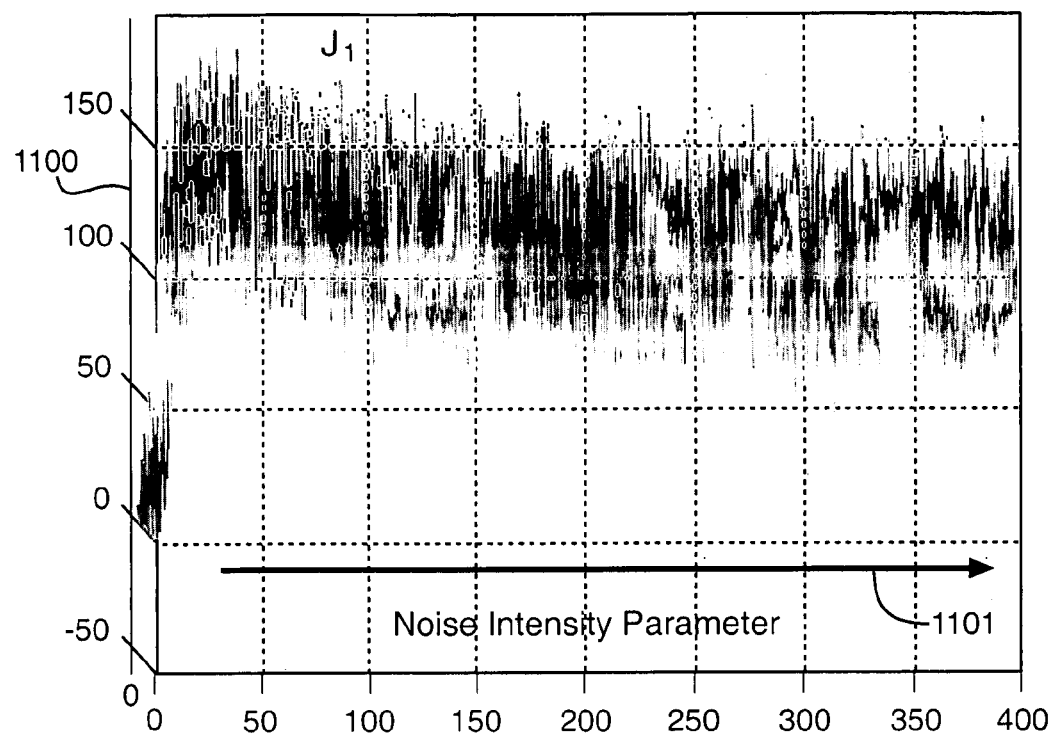
FIG. 11 shows a rotation of the FIG. 10 plot.
Figure 12:
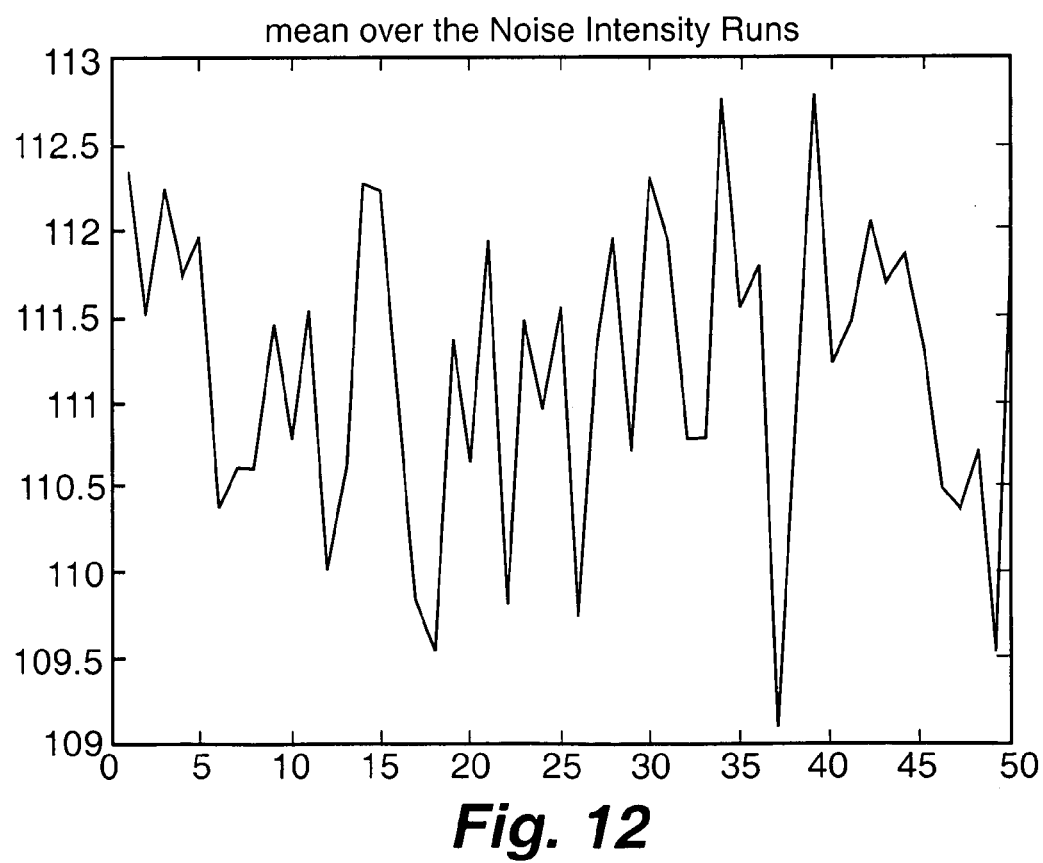
FIG. 12 shows a graph of the performance averaged across all 400 noise runs.
Figure 13:
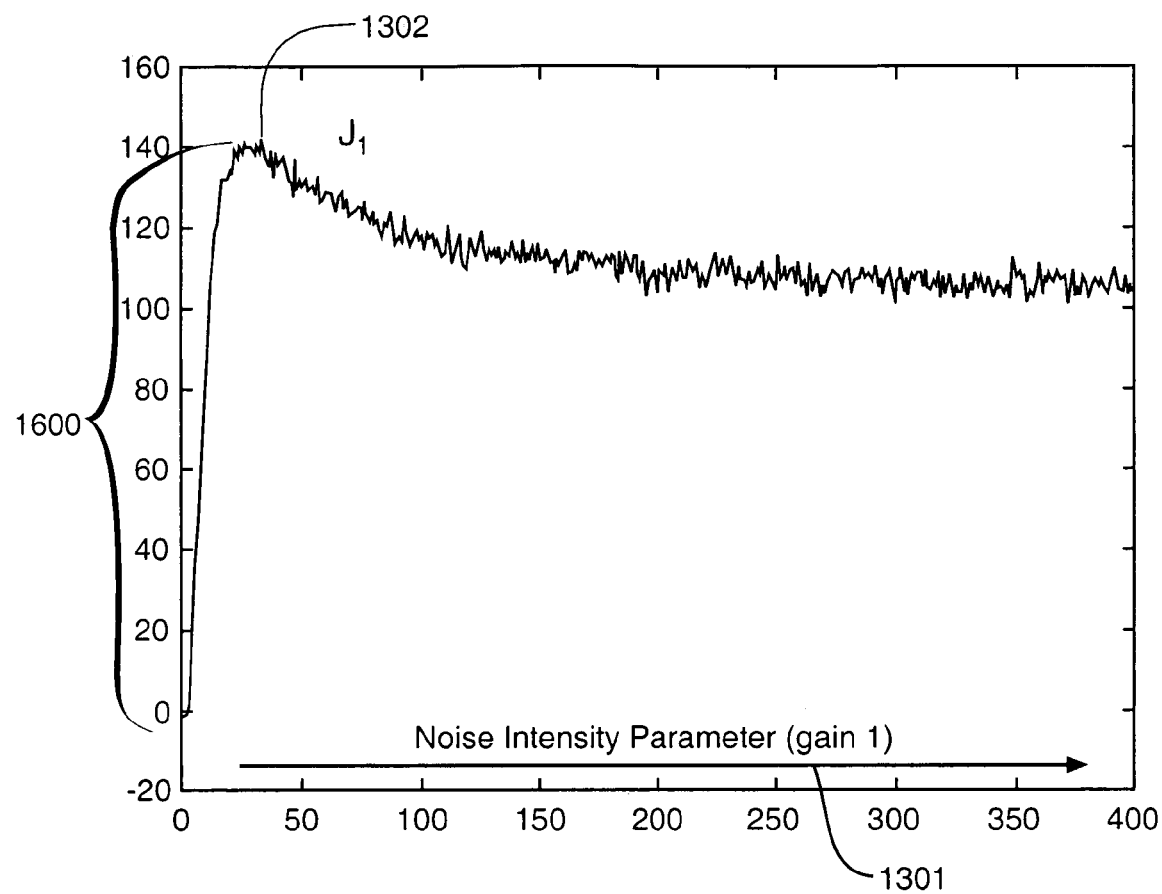
FIG. 13 shows a resonance effect of the graph of FIG. 12.

FIG. 11 shows a graph of the performance of FIGS. 9 and 10 averaged across all 400 noise runs. FIG. 11 rotates FIG. 11 to observe the general trends in the performance metric $J_1$ 1100 versus the noise parameter on the noise intensity axis 1101. Two types of averaging methods will be performed on these data. In FIG. 12 shows $J_1$ averaged across all 400 noise runs to show the variability due only to the Monte Carlo generation of the noise. For the 50 Monte Carlo runs displayed, the ratio of standard deviation to mean is less than 10 percent FIG. 13 is the final plot we wish to compare to FIG. 2. Here the independent variable is the noise intensity parameter (gain1) 1301 and the averaging is across the 50 Monte Carlo runs. FIG. 13 shows the true resonance effect and has similarities to the hypothesized curve in FIG. 2. The amount of improvement is striking. $J_1$ increases from zero to almost 140 units, illustrated at 1302, showing substantial improvement over the no noise case.

The foregoing description of the preferred embodiment has been presented for purposes of illustration and description. It is not intended to be exhaustive or to limit the invention to the precise form disclosed. Obvious modification or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular scope of the invention as determined by the appended claims when interpreted in accordance with the breadth to which they are fairly, legally and equitably entitled.

What is claimed is:

1. An image enhancement device comprising:
   visual data of a desired object within a compressed image;
   a central processing unit for receiving said visual data;
   a plurality of histograms, generated by said central processing unit, of frequency of pixels versus darkness level within each primary color red, blue and green of said visual data;
   a parabolic template constructed by said central processing unit with the vertex of the parabola appearing at the mean distribution of the total area under the histogram curve;
   means for overlaying a true histogram from said visual data and said parabolic template;
   a spatial gradient of all candidate pixels generated by said central processing unit;
   N number of pixels with maximum gradients moved through operator adjustment; and an output signal of an enhanced visual image of said desired object transferred from said central processing unit to said operator.

2. The image enhancement device of claim 1 further comprising multi-spectral sensors on an operator wearing a head mounted display for receiving said visual data.

3. The image enhancement device of claim 1 further comprises an operator wearing an eye-glass system for receiving said visual data.

4. The image enhancement device of claim 1 wherein said N number of pixels further comprises N number of pixels with maximum gradients moved left to zero or pure black through operator adjustment.

5. The image enhancement device of claim 1 wherein said N number of pixels further comprises N number of pixels with maximum gradients moved right to one or pure white.

6. The image enhancement device of claim 1 wherein said visual data further comprises visual data of a desired object within a compressed .jpg image.

7. The image enhancement device of claim 1 wherein said means for overlaying further comprises means for overlaying a true histogram from said visual data and said parabolic template where a vertex of said parabolic template touches an x-axis.

8. The image enhancement device of claim 1 wherein said means for overlaying further comprises:
   a preselected darkness level threshold;
   means for first setting a darkness level to zero when, for each pixel, the darkness level is less than or equal to said threshold; and
   means for second setting a darkness level to one, when for each pixel, the darkness level is greater than the threshold.

9. The image enhancement device of claim 8 wherein said preselected darkness level threshold further comprises a preselected darkness level threshold of 0.5 for a darkness level varying between 0 and 1.

10. The image enhancement device of claim 1 further comprising means for reassigning pixels as black white.

11. The image enhancement device of claim 1 wherein said spatial gradient further comprises a spatial gradient of all candidate pixels and means for rank ordering said spatial gradients in terms of magnitude.

12. The image enhancement device of claim 1 wherein N number of pixels further comprises N number of pixels with maximum gradients moved through operator adjustment knob manipulation.

13. The image enhancement method of claim 1 wherein said visual data further comprises visual data of a desired object within an 8-bit color compressed image.

14. An image enhancement device comprising:
   visual data of a desired object within a compressed image using multi-spectral sensors from an operator wearing a head-mounted display;
   a central processing unit for receiving said visual data;
   a plurality of histograms, generated by said central processing unit, of frequency of pixels versus darkness level within each primary color red, blue and green and means for selecting the most highly uncertain color;
   a parabolic template constructed by said central processing unit with the vertex of the parabola appearing at the mean distribution of the total area under the histogram curve;
   means for overlaying a true histogram from said visual data and said parabolic template comprising:
      a darkness level threshold of 0.5 for a darkness level varying between 0 and 1;
      means for first setting a darkness level to zero when, for each pixel, the darkness level is less than or equal to said threshold; and
      means for second setting a darkness level to one, when for each pixel, the darkness level is greater than the threshold;
   a spatial gradient of all candidate pixels generated by said central processing unit;
   N number of pixels with maximum gradients moved through operator adjustment knob manipulation;
   an output signal of an enhanced visual image of said desired object transferred from said central processing unit to said operator.

* * * * *